(12) United States Patent
Chang

(10) Patent No.: US 10,595,213 B2
(45) Date of Patent: Mar. 17, 2020

(54) METHOD AND APPARATUS FOR CONFIGURING SECONDARY CELL, AND HOST

(71) Applicant: Huawei Technologies Co., Ltd., Shenzhen (CN)

(72) Inventor: Junren Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 15/017,387

(22) Filed: Feb. 5, 2016

(65) Prior Publication Data
US 2016/0157110 A1 Jun. 2, 2016

Related U.S. Application Data

(63) Continuation of application No. PCT/CN2013/080969, filed on Aug. 7, 2013.

(51) Int. Cl.
*H04W 24/02* (2009.01)
*H04W 72/04* (2009.01)
*H04W 76/30* (2018.01)
*H04W 72/00* (2009.01)

(52) U.S. Cl.
CPC ....... *H04W 24/02* (2013.01); *H04W 72/0426* (2013.01); *H04W 76/30* (2018.02); *H04W 72/00* (2013.01)

(58) Field of Classification Search
None
See application file for complete search history.

(56) References Cited

U.S. PATENT DOCUMENTS

| 2012/0106510 | A1 | 5/2012 | Kuo | |
| 2013/0148535 | A1 | 6/2013 | Baghel et al. | |
| 2013/0188473 | A1* | 7/2013 | Dinan | H04W 56/0005 370/216 |
| 2013/0188613 | A1 | 7/2013 | Dinan | |
| 2013/0258862 | A1* | 10/2013 | Dinan | H04W 56/00 370/241 |

(Continued)

FOREIGN PATENT DOCUMENTS

| CN | 102244927 A | 11/2011 |
| CN | 102624494 A | 8/2012 |

(Continued)

OTHER PUBLICATIONS

"Discussion on dual RRC," 3GPP TSG-RAN WG2 Meeting #82, Fukuoka, Japan, R2-131830, $3^{rd}$ Generation Partnership Project, Valbonne, France (May 20-24, 2013).

(Continued)

*Primary Examiner* — Saba Tsegaye
(74) *Attorney, Agent, or Firm* — Leydig, Voit & Mayer, Ltd.

(57) ABSTRACT

The present application relates to the field of communications technologies, and embodiments of the present application disclose a method and an apparatus for configuring a secondary cell, and a host, where the method includes: receiving a secondary cell configuration message sent by a first base station, where the secondary cell configuration message includes a secondary cell index configured by the first base station for a secondary cell.

18 Claims, 9 Drawing Sheets

(56) References Cited

U.S. PATENT DOCUMENTS

| | | | | |
|---|---|---|---|---|
| 2014/0198746 | A1* | 7/2014 | Ahn | H04L 5/001 370/329 |
| 2014/0269575 | A1 | 9/2014 | Zhang et al. | |
| 2014/0335874 | A1 | 11/2014 | Bakker et al. | |
| 2015/0099501 | A1* | 4/2015 | Kim | H04W 52/0216 455/418 |
| 2015/0319801 | A1* | 11/2015 | Lee | H04W 56/00 370/329 |

FOREIGN PATENT DOCUMENTS

| | | |
|---|---|---|
| CN | 102804839 A | 11/2012 |
| CN | 103051412 A | 4/2013 |
| CN | 103139911 A | 6/2013 |
| EP | 2747488 A1 | 6/2014 |
| EP | 2773157 A1 | 9/2014 |
| JP | 2012100262 A | 5/2012 |
| JP | 2013042258 A | 2/2013 |
| WO | 2012008643 A1 | 1/2012 |
| WO | WO 2012108643 A2 | 8/2012 |

OTHER PUBLICATIONS

"Analysis on RRC Message Ambiguity for C-plane Architectures," 3GPP TSG RAN WG2 Meeting #82, Fukuoka, Japan, R2-131917, pp. 1-3, 3rd Generation Partnership Project, Valbonne, France (May 20-24, 2013).

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300, V11.6.0, pp. 1-209, $3^{rd}$ Generation Partnership Project, Valbonne, France (Jun. 2013).

"$3^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.3.0, pp. 1-57, $3^{rd}$ Generation Partnership Project, Valbonne, France (Jun. 2013).

"$3^{rd}$ Generation Partnership Project; Technical Specification Group Radio Access Network; Evolved Universal Terrestrial Radio Access (E-UTR); Radio Resource Control (RRC); Protocol specification (Release 11)," 3GPP TS 36.331, V11.4.0, pp. 1-346, $3^{rd}$ Generation Partnership Project, Valbonne, France (Jun. 2013).

"$3^{rd}$ Generation Partnership Project; Technical Specification Group Radio Access Network; Evolved Universal Terrestrial Radio Access Network (E-UTRAN); X2 application protocol (X2AP) (Release 11)," 3GPP TS 36.423, V11.5.0, pp. 1-144, $3^{rd}$ Generation Partnership Project, Valbonne, France (Jun. 2013).

CN 201380000987.0, Office Action, dated Dec. 28, 2017.

\* cited by examiner

METHOD AND APPARATUS FOR CONFIGURING SECONDARY CELL, AND HOST

CROSS-REFERENCE

This application is a continuation of International Patent Application No. PCT/CN2013/080969, filed on Aug. 7, 2013, which is hereby incorporated by reference in its entirety.

TECHNICAL FIELD

The present application relates to the field of communications technologies, and in particular, to a method and an apparatus for configuring a secondary cell, and a host.

BACKGROUND

With rapid development of communications technologies, coexistence and development of various types of wireless network cells become a development trend in future communications networks; therefore, a cell in multi-point convergence is gradually introduced to a wireless network. In a network in multi-point convergence, a coverage area of the network is formed by cells of different sizes and types, and the cells include a macro cell, a small cell, and the like. A coverage area of a macro cell includes coverage areas of multiple small cells, where the small cells are generally discretely set in the macro cell. Most macro cells use a low frequency band carrier, which features a continuous coverage area, so that seamless coverage is implemented among the macro cells. However, low frequency resources are scarcer. With popularization of terminals such as smartphones, users impose a higher requirement for a wireless transmission rate. To meet the users' requirement, a high frequency band carrier with abundant resources needs to be gradually used to provide a service. Because a high frequency band carrier features a small coverage area, a base station that uses a high frequency band carrier to implement small coverage is generally referred to as a small eNodeB (SeNB, Small eNB), and sometimes the small eNodeB is also referred to as a secondary eNodeB, that is, a secondary eNB, which may also be abbreviated to SeNB. A coverage area of the small eNodeB is generally referred to as a small cell. Although a coverage area of a high frequency band carrier is smaller, resources are relatively abundant.

In traditional 2G and 3G networks, a carrier at a lower frequency band is generally used. For example, a macro cell is used to provide a service for a user. When network load of the macro cell is heavier, a terminal may be handed over to a corresponding small cell to offload network services, so as to increase a network capacity. Currently, to increase a transmission rate of a wireless network and improve user experience, network enhancement in a small cell has become a research topic. A main idea of small cell enhancement is that user equipment (UE, User Equipment) may obtain more available wireless resources by simultaneously aggregating carriers from a macro cell and a small cell, thereby increasing a data transmission rate. Currently, a possible orientation is that a macro eNodeB (MeNB, macro eNB) is used as a main control station responsible for mobility management of user equipment, data packet offloading, and the like. In a case in which a macro eNodeB is used as a main control station, the macro eNodeB is sometimes also referred to as a master eNodeB, that is, a Master eNB, which may also be abbreviated to MeNB. When user equipment simultaneously works in a macro eNodeB and a small eNodeB, because distances from the two base stations to the user equipment are different, when the user equipment performs uplink data transmission, different uplink timing advances (TA, timing advance) are generally required to send uplink data. Generally, all cells in the macro eNodeB may be grouped into a cell group, and when the user equipment performs uplink data transmission in the cell group, a same TA value is used. Therefore, the group of cells that use the same TA sometimes is also referred to as a TA group (TAG Timing advance Group). Likewise, a cell controlled by a small eNodeB may also be used as a TA group, and when user equipment performs uplink data transmission in cells in different TA groups, TA values corresponding to these TA groups are used for transmission. Correspondingly, when a macro eNodeB or a small eNodeB configures one or more cells in a TA group for user equipment for data transmission, these cells are generally referred to as secondary cells (Secondary Cell, SCell).

When user equipment simultaneously works in two base stations, that is, a macro eNodeB and a small eNodeB, if the macro eNodeB and the small eNodeB each independently configure one or more secondary cells for the user equipment, a secondary cell index (SCell index) of a secondary cell configured by the macro eNodeB may be the same as a secondary cell index of a secondary cell controlled by the small eNodeB. In this case, if the user equipment receives an operation related to the secondary cell, a misoperation may occur because of a conflict between the secondary cell indexes of the two base stations. For example, when a command for activating a secondary cell of the macro eNodeB is received, a secondary cell of the small eNodeB may be incorrectly activated; or when a timing adjustment command for a TAG of a secondary cell of the macro eNodeB is received, timing of a TAG of a secondary cell of the small eNodeB may be incorrectly adjusted. In a case in which timing adjustment is incorrectly performed, the UE uses incorrect uplink timing to perform transmission. Consequently, not only a signal of the UE itself cannot be correctly received by a base station, but also severe interference may be brought to uplink transmission of another UE. Currently, one solution is: When an operation such as activating a secondary cell is being performed, an identifier of a station to which the secondary cell belongs is clearly indicated in a related message, so as to help user equipment to clearly determine whether each of two secondary cells with a same secondary cell index belongs to a macro eNodeB or a small eNodeB. However, this causes that a related message or related signaling needs to carry a device identifier of a base station each time, leading to heavier load of the message.

SUMMARY

In view of this, the present application provides a method and an apparatus for configuring a secondary cell, and a host, so as to resolve a problem of incorrect activation or timing adjustment that occurs when user equipment performs operations such as activation or timing adjustment on a secondary cell; in addition, a related message or related signaling delivered by a base station does not need to carry a device identifier of the base station each time.

A first aspect of the present application provides a method for configuring a secondary cell, including:

receiving a secondary cell configuration message sent by a first base station, where the secondary cell configuration message includes a secondary cell index configured by the first base station for a secondary cell, and the secondary cell is a cell of another base station except the first base station;

sending secondary cell configuration information to user equipment, where the secondary cell configuration information includes the secondary cell index configured by the first base station for the secondary cell, the user equipment configures the index for the corresponding secondary cell according to the secondary cell index, and the secondary cell index is used for activation or deactivation of the secondary cell; and receiving a secondary cell configuration completion message fed back by the user equipment, or receiving secondary cell configuration completion information sent by the first base station, so as to determine that configuration of the secondary cell is completed, where:

the secondary cell configuration completion information is that the first base station receives the secondary cell configuration completion message fed back by the user equipment; or the secondary cell configuration completion information is generated by the first base station after the secondary cell configuration completion message fed back by the user equipment is received.

With reference to the first aspect, in a first possible implementation manner of the first aspect, before the receiving a secondary cell configuration message sent by a first base station, the method further includes:

when one or more secondary cells are about to be configured or reconfigured for the user equipment, or when a secondary cell/secondary eNodeB addition request message sent by the first base station is received, or when a service offloading request message sent by the first base station is received, sending a secondary cell configuration request message to the first base station, where the secondary cell configuration request message is used to request the first base station to allocate a secondary cell index.

With reference to the first aspect, in a second possible implementation manner of the first aspect, the secondary cell configuration message further includes a group index that is of a timing advance group to which the secondary cell belongs and is configured by the first base station for the secondary cell; and the secondary cell configuration information further includes the group index that is of the timing advance group to which the secondary cell belongs and is configured by the first base station for the secondary cell.

With reference to the first aspect, in a third possible implementation manner of the first aspect, the secondary cell configuration message further includes:

at the time of the receiving a secondary cell configuration message sent by a first base station, a secondary cell/secondary eNodeB addition request message or a service offloading request message sent by the first base station is simultaneously received;

or the secondary cell configuration message is included in a secondary cell/secondary eNodeB addition request message or a service offloading request message sent by the first base station.

With reference to the first possible implementation manner of the first aspect or the third possible implementation manner of the first aspect, in a fourth possible implementation manner of the first aspect, after the receiving a secondary cell configuration message sent by a first base station, the method further includes:

sending a secondary cell configuration acknowledgment message to the first base station, where:

the secondary cell configuration acknowledgment message includes acknowledgment information that the secondary cell index is configured for the secondary cell;

or the secondary cell configuration acknowledgment message includes the secondary cell index configured for the secondary cell.

With reference to the first possible implementation manner of the first aspect, in a fifth possible implementation manner of the first aspect, the secondary cell configuration request message further includes:

a secondary cell index expected to be used, and/or an index that is expected to be used and of a timing advance group to which the secondary cell belongs.

With reference to the first aspect, in a sixth possible implementation manner of the first aspect, after configuration of the secondary cell is completed, the method further includes:

sending secondary cell activation information to the user equipment, where the secondary cell activation information includes instruction information about activating and/or deactivating the secondary cell.

With reference to the sixth possible implementation manner of the first aspect, in a seventh possible implementation manner of the first aspect, after the sending secondary cell activation information to the user equipment, the method further includes:

sending uplink timing advance information to the user equipment, where the uplink timing advance information includes a timing advance used for adjusting an uplink timing advance of the secondary cell, and an index of a timing advance group to which the secondary cell belongs.

With reference to the first aspect or any one implementation manner of the first to the seventh possible implementation manners of the first aspect, in an eighth possible implementation manner of the first aspect, the method further includes:

when it is determined to release the secondary cell or after the secondary cell is released, sending a secondary cell release indication message to the first base station, where the secondary cell release indication message includes information about the released secondary cell.

A second aspect of the present application provides a method for configuring a secondary cell, including:

receiving a secondary cell configuration request message sent by a second base station, where the secondary cell configuration request message is used to request to allocate a secondary cell index to a secondary cell, and the secondary cell is a cell of the second base station;

sending a secondary cell configuration message to the second base station, where the secondary cell configuration message includes a secondary cell index configured for the secondary cell;

receiving a secondary cell configuration completion message fed back by user equipment; and sending secondary cell configuration completion information to the second base station, where:

the secondary cell configuration completion information is that the secondary cell configuration completion message fed back by the user equipment is received; or the secondary cell configuration completion information is generated after the secondary cell configuration completion message fed back by the user equipment is received.

With reference to the second aspect, in a first possible implementation manner of the second aspect, before the receiving a secondary cell configuration request message sent by a second base station, the method further includes:

sending a secondary cell/secondary eNodeB addition request message or a service offloading request message to the second base station.

With reference to the second aspect, in a second possible implementation manner of the second aspect, after configuration of the secondary cell is completed, the method further includes:

sending secondary cell activation information to the user equipment, where the secondary cell activation information includes instruction information about activating and/or deactivating the secondary cell.

With reference to the first possible implementation manner of the second aspect, in a third possible implementation manner of the second aspect, after the sending secondary cell activation information to the user equipment, the method further includes:

sending uplink timing advance information to the user equipment, where the uplink timing advance information includes a timing advance used for adjusting an uplink timing advance of the secondary cell, and an index of a timing advance group to which the secondary cell belongs.

With reference to the second aspect, or the first possible implementation manner of the second aspect, or the second possible implementation manner of the second aspect, or the third possible implementation manner of the second aspect, in a fourth possible implementation manner of the second aspect, the method further includes:

after a secondary cell release indication message is received, releasing information that is related to a released secondary cell and included in the secondary cell release indication message.

A third aspect of the present application provides an apparatus for configuring a secondary cell, including:

a secondary cell configuration message receiving unit, configured to receive a secondary cell configuration message sent by a first base station, where the secondary cell configuration message includes a secondary cell index configured by the first base station for a secondary cell, and the secondary cell is a cell of another base station except the first base station;

a secondary cell configuration information sending unit, configured to send secondary cell configuration information to user equipment, where the secondary cell configuration information includes the secondary cell index configured by the first base station for the secondary cell, the user equipment configures the index for the corresponding secondary cell according to the secondary cell index, and the secondary cell index is used for activation or deactivation of the secondary cell; and a feedback receiving unit, configured to receive a secondary cell configuration completion message fed back by the user equipment, or receive secondary cell configuration completion information sent by the first base station, so as to determine that configuration of the secondary cell is completed, where:

the secondary cell configuration completion information is that the first base station receives the secondary cell configuration completion message fed back by the user equipment; or the secondary cell configuration completion information is generated by the first base station after the secondary cell configuration completion message fed back by the user equipment is received.

With reference to the third aspect, in a first possible implementation manner of the third aspect, the apparatus further includes a secondary cell configuration request message sending unit, where the secondary cell configuration request message sending unit is configured to:

when one or more secondary cells are about to be configured or reconfigured for the user equipment, or when a secondary cell/secondary eNodeB addition request message sent by the first base station is received, or when a service offloading request message sent by the first base station is received, send a secondary cell configuration request message to the first base station, where the secondary cell configuration request message is used to request the first base station to allocate a secondary cell index.

With reference to the third aspect, in a second possible implementation manner of the third aspect, the secondary cell configuration message further includes a group index that is of a timing advance group to which the secondary cell belongs and is configured by the first base station for the secondary cell; and the secondary cell configuration information further includes the group index that is of the timing advance group to which the secondary cell belongs and is configured by the first base station for the secondary cell.

With reference to the third aspect, in a third possible implementation manner of the third aspect, the apparatus further includes a service request message sending unit, where the service request message sending unit is configured to: when the secondary cell configuration message receiving unit receives the secondary cell configuration message sent by the first base station, simultaneously receive a secondary cell/secondary eNodeB addition request message or a service offloading request message sent by the first base station;

or the secondary cell configuration message received by the secondary cell configuration message receiving unit is included in a secondary cell/secondary eNodeB addition request message or a service offloading request message sent by the service request message sending unit.

With reference to the first possible implementation manner of the third aspect or the third possible implementation manner of the third aspect, in a fourth possible implementation manner of the first aspect, the apparatus further includes:

a message acknowledgment unit, configured to send a secondary cell configuration acknowledgment message to the first base station, where:

the secondary cell configuration acknowledgment message includes acknowledgment information that the secondary cell index is configured for the secondary cell;

or the secondary cell configuration acknowledgment message includes the secondary cell index configured for the secondary cell.

With reference to the first possible implementation manner of the third aspect, in a fifth possible implementation manner of the third aspect, the secondary cell configuration request message further includes:

a secondary cell index expected to be used, or an index that is expected to be used and of a timing advance group to which the secondary cell belongs.

With reference to the third aspect, in a sixth possible implementation manner of the third aspect, the apparatus further includes:

an activation message sending unit, configured to send secondary cell activation information to the user equipment, where the secondary cell activation information includes instruction information about activating and/or deactivating the secondary cell.

With reference to the sixth possible implementation manner of the third aspect, in a seventh possible implementation manner of the third aspect, the apparatus further includes:

an uplink timing advance information sending unit, configured to send uplink timing advance information to the user equipment, where the uplink timing advance information includes a timing advance used for adjusting an uplink timing advance of the secondary cell, and an index of a timing advance group to which the secondary cell belongs.

With reference to the third aspect or any one implementation manner of the first to the seventh possible implementation manners of the third aspect, in an eighth possible implementation manner of the third aspect, the apparatus further includes:

a release message sending unit, configured to: when it is determined to release the secondary cell or after the secondary cell is released, send a secondary cell release indication message to the first base station, where the secondary cell release indication message includes information about the released secondary cell.

A fourth aspect of the present application provides an apparatus for configuring a secondary cell, including:

a secondary cell configuration request message receiving unit, configured to receive a secondary cell configuration request message sent by a second base station, where the secondary cell configuration request message is used to request to allocate a secondary cell index to a secondary cell, and the secondary cell is a cell of the second base station;

a secondary cell configuration message sending unit, configured to send a secondary cell configuration message to the second base station, where the secondary cell configuration message includes a secondary cell index configured for the secondary cell;

a secondary cell configuration completion message receiving unit, configured to receive a secondary cell configuration completion message fed back by user equipment; and a feedback sending unit, configured to send secondary cell configuration completion information to the second base station, where:

the secondary cell configuration completion information is that the secondary cell configuration completion message fed back by the user equipment is received; or the secondary cell configuration completion information is generated after the secondary cell configuration completion message fed back by the user equipment is received.

With reference to the fourth aspect, in a first possible implementation manner of the fourth aspect, the apparatus further includes:

a request message sending unit, configured to send a secondary cell/secondary eNodeB addition request message or a service offloading request message to the second base station.

With reference to the fourth aspect, in a second possible implementation manner of the fourth aspect, the apparatus further includes:

a secondary cell activation information sending unit, configured to send secondary cell activation information to the user equipment, where the secondary cell activation information includes instruction information about activating and/or deactivating the secondary cell.

With reference to the first possible implementation manner of the fourth aspect, in a third possible implementation manner of the fourth aspect, the apparatus further includes:

an uplink timing advance information sending unit, configured to send uplink timing advance information to the user equipment, where the uplink timing advance information includes a timing advance used for adjusting an uplink timing advance of the secondary cell, and an index of a timing advance group to which the secondary cell belongs.

With reference to the fourth aspect, or the first possible implementation manner of the fourth aspect, or the second possible implementation manner of the fourth aspect, or the third possible implementation manner of the fourth aspect, in a fourth possible implementation manner of the fourth aspect, the apparatus further includes:

a releasing unit, configured to: after a secondary cell release indication message is received, release information that is related to a released secondary cell and included in the secondary cell release indication message.

A fifth aspect of the present application provides a host, including a processor, a communications interface, a memory, and a bus, where:

the processor, the communications interface, and the memory complete mutual communication by using the bus;

the communications interface is configured to receive a secondary cell configuration message sent by a first base station, where the secondary cell configuration message includes a secondary cell index configured by the first base station for a secondary cell, and the secondary cell is a cell of another base station except the first base station;

the processor is configured to execute a program; and the memory is configured to store the program, where:

the program is used to:

send secondary cell configuration information to user equipment, where the secondary cell configuration information includes the secondary cell index configured by the first base station for the secondary cell, the user equipment configures the index for the corresponding secondary cell according to the secondary cell index, and the secondary cell index is used for activation or deactivation of the secondary cell; and receive a secondary cell configuration completion message fed back by the user equipment, or receive secondary cell configuration completion information sent by the first base station, so as to determine that configuration of the secondary cell is completed, where:

the secondary cell configuration completion information is that the first base station receives the secondary cell configuration completion message fed back by the user equipment; or the secondary cell configuration completion information is generated by the first base station after the secondary cell configuration completion message fed back by the user equipment is received.

A sixth aspect of the present application provides a host, including a processor, a communications interface, a memory, and a bus, where:

the processor, the communications interface, and the memory complete mutual communication by using the bus;

the communications interface is configured to receive a secondary cell configuration request message sent by a second base station, where the secondary cell configuration request message is used to request to allocate a secondary cell index to a secondary cell, and the secondary cell is a cell of the second base station;

the processor is configured to execute a program; and
the memory is configured to store the program, where:
the program is used to:
send a secondary cell configuration message to the second base station, where the secondary cell configuration message includes a secondary cell index configured for the secondary cell;

receive a secondary cell configuration completion message fed back by user equipment; and send secondary cell configuration completion information to the second base station, where:

the secondary cell configuration completion information is that the secondary cell configuration completion message fed back by the user equipment is received; or the secondary cell configuration completion information is generated after the secondary cell configuration completion message fed back by the user equipment is received.

Embodiments of the present application provide the method for configuring a secondary cell. A macro eNodeB allocates a secondary cell index, where the secondary cell index is used by user equipment to configure the index for a corresponding secondary cell; after completing configuration of the secondary cell index, the user equipment feeds back a secondary cell configuration completion message; and after the secondary cell configuration completion message fed back is received or a secondary cell configuration completion message sent by the macro eNodeB is received, configuration of the secondary cell is completed. After configuration of the secondary cell is completed, when the macro eNodeB or a small eNodeB delivers a related operation instruction to perform a related operation such as activation or deactivation, or delivers a timing advance adjustment message, a related message or related signaling does not need to carry a device identifier of the base station each time. Therefore, a load information amount of a message can be reduced.

DESCRIPTION OF EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts shall fall within the protection scope of the present application.

For reference and clarity, technical terms, abbreviations, and acronyms used in the following are summarized as follows:

macro eNodeB: MeNB, macro eNB;
master eNodeB: MeNB, Master eNB;
secondary eNodeB: SeNB, secondary eNB;
small eNodeB: SeNB, Small eNB;
timing advance group: TA group, TAG Timing advanced Group;
uplink timing advance: TA, timing advance;
secondary cell: SCell; and
secondary cell index: SCell index.

All the following embodiments of the present application are described by using an example in which a macro eNodeB is used as a master eNodeB, and a small eNodeB is used as a secondary eNodeB. In all the following embodiments of the present application, a first base station may be a macro eNodeB, and a second base station may be a small eNodeB. It may be understood that a macro eNodeB may also be used as a secondary eNodeB, and a small eNodeB may also be used as a master eNodeB. When a macro eNodeB is use as a secondary eNodeB, and a small eNodeB is used as a master eNodeB, reference may be made to the embodiments of the present application, and details are not described herein.

Figure 1:
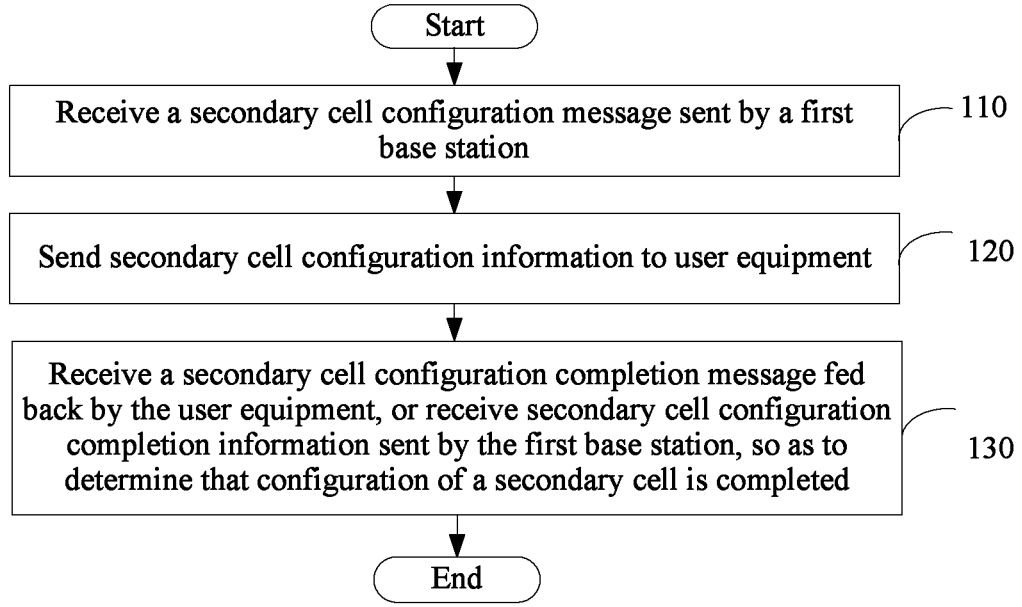
FIG. 1 is a schematic flowchart of a method for configuring a secondary cell according to an embodiment of the present application.

Referring to FIG. 1, an embodiment of the present application discloses a schematic flowchart of a method for configuring a secondary cell, where the method includes:

Step 110: Receive a secondary cell configuration message sent by a first base station.

The secondary cell configuration message may include a secondary cell index configured by the first base station for a secondary cell, where the secondary cell is a cell of another base station except the first base station, such as a cell of a second base station.

Step 120: Send secondary cell configuration information to user equipment.

The secondary cell configuration information includes the secondary cell index configured by the first base station for the secondary cell, the user equipment configures the index for the corresponding secondary cell according to the secondary cell index, and the secondary cell index is used for activation or deactivation of the secondary cell.

Step 130: Receive a secondary cell configuration completion message fed back by the user equipment, or receive secondary cell configuration completion information sent by the first base station, so as to determine that configuration of a secondary cell is completed.

The secondary cell configuration completion information is that the first base station receives the secondary cell configuration completion message fed back by the user equipment; or the secondary cell configuration completion information is generated by the first base station after the secondary cell configuration completion message fed back by the user equipment is received.

This embodiment of the present application provides the method for configuring a secondary cell. A first base station allocates a secondary cell index, where the secondary cell index is used by user equipment to configure the index for a corresponding secondary cell; after completing configuration of the secondary cell index, the user equipment feeds back a secondary cell configuration completion message; and after the secondary cell configuration completion message fed back is received or a secondary cell configuration completion information sent by the first base station is received, configuration of the secondary cell is completed. After configuration of the secondary cell is completed, when the first base station or a second base station further delivers a related operation instruction to perform a related operation such as activation or deactivation, or delivers a timing advance adjustment message, a related message or related signaling does not need to carry a device identifier of the base station each time. Therefore, a load information amount of a message can be reduced.

Figure 2:
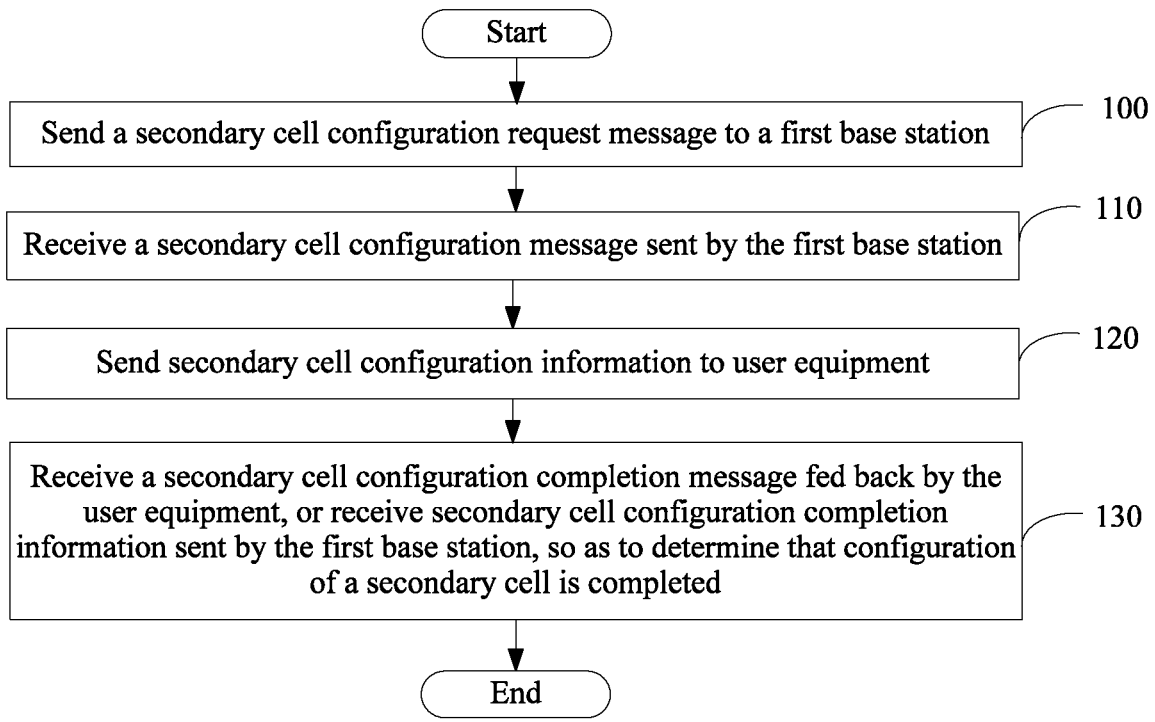
FIG. 2 is another schematic flowchart of a method for configuring a secondary cell according to an embodiment of the present application.

Referring to FIG. 2, an embodiment of the present application discloses a schematic flowchart of a method for configuring a secondary cell, where the method includes:

Step 100: When one or more secondary cells are about to be configured or reconfigured for user equipment, or when a secondary cell/secondary eNodeB addition request message sent by a first base station is received, or when a service offloading request message sent by a first base station is received, send a secondary cell configuration request message to the first base station, where the secondary cell configuration request message is used to request the first base station to allocate a secondary cell index.

The first base station may be a macro eNodeB, and the secondary cell configuration request message may include a secondary cell index expected to be used, or an index that is expected to be used and of a timing advance group to which the secondary cell belongs.

Step 110: Receive a secondary cell configuration message sent by the first base station.

The secondary cell configuration message includes a secondary cell index configured by the first base station for the secondary cell, where the secondary cell is a cell of another base station except the first base station. The secondary cell index may be the secondary cell index that is expected to be used and is in the secondary cell configuration request message received by the first base station, or may be an unallocated secondary cell index selected by the first base station.

Further, when the secondary cell configuration message sent by the first base station is received, a secondary cell/secondary eNodeB addition request message or a service offloading request message sent by the first base station may be simultaneously received;

or the secondary cell configuration message is included in a secondary cell/secondary eNodeB addition request message or a service offloading request message sent by the first base station.

In another embodiment of the present application, after the secondary cell configuration message sent by the first base station is received, the method may further include: sending a secondary cell configuration acknowledgment message to the first base station, where the secondary cell configuration acknowledgment message includes acknowledgment information that the secondary cell index is configured for the secondary cell, or the secondary cell configuration acknowledgment message includes the secondary cell index configured for the secondary cell.

Step 120: Send secondary cell configuration information to the user equipment.

The secondary cell configuration information includes the secondary cell index configured by the first base station for the secondary cell, the user equipment configures the index for the corresponding secondary cell according to the secondary cell index, and the secondary cell index is used for activation or deactivation of the secondary cell.

Further, the secondary cell configuration message may further include a group index that is of a timing advance group to which the secondary cell belongs and is configured by the first base station for the secondary cell. Correspondingly, the secondary cell configuration information may further include the group index that is of the timing advance group to which the secondary cell belongs and is configured by the first base station for the secondary cell.

The group index of the timing advance group to which the secondary cell belongs is a part of uplink timing advance information, where the uplink timing advance information may further include a timing advance used for adjusting an uplink timing advance of the secondary cell. The uplink timing advance information is used by the user equipment to adjust uplink timing. Uplink timing of the user equipment changes as the user equipment moves. If uplink timing is not adjusted, a base station cannot correctly receive a signal sent by the user equipment.

In another embodiment of the present application, when user equipment simultaneously works in two base stations, that is, a first base station and a second base station, if the first base station and the second base station each independently configure one or more secondary cells for the user equipment, a secondary cell index of a secondary cell configured by the first base station may be the same as a secondary cell index of a secondary cell controlled by the second base station. In this case, if the user equipment receives an operation related to the secondary cell, a misoperation may occur because of a conflict between the secondary cell indexes of the two base stations. For example, when a command for activating a secondary cell of the first base station is received, a secondary cell of the second base station may be incorrectly activated; or when a timing adjustment command for a TAG of a secondary cell of the first base station is received, timing of a TAG of a secondary cell of the second base station may be incorrectly adjusted. To avoid a case in which secondary cell indexes of different secondary cells are the same, a related message, for example, an RRC reconfiguration message, needs to be limited. The RRC reconfiguration message can be sent only at a corresponding station, but cannot be sent across stations. In this way, even if secondary cell indexes of two different secondary cells are the same, it can be determined on a user equipment side that operations, such as configuration or activation, are performed on which secondary cell. Further, the secondary cell configuration message may further include an RRC reconfiguration message, and after receiving the RRC reconfiguration message, the user equipment configures a secondary cell index for a corresponding secondary cell.

Step 130: Receive a secondary cell configuration completion message fed back by the user equipment, or receive secondary cell configuration completion information sent by the first base station, so as to determine that configuration of the secondary cell is completed.

The secondary cell configuration completion information is that the first base station receives the secondary cell configuration completion message fed back by the user equipment; or the secondary cell configuration completion information is generated by the first base station after the secondary cell configuration completion message fed back by the user equipment is received.

The user equipment sends the secondary cell configuration completion message to the first base station or the second base station. If the user equipment receives the secondary cell configuration information from the first base station, the user equipment sends the secondary cell configuration completion message to the first base station, and then the first base station sends an indication message to the second base station according to the secondary cell configuration completion message, so as to notify the second base station that the user equipment has completed configuration of the secondary cell. Alternatively, if the user equipment receives the secondary cell configuration information from the second base station, the user equipment sends the secondary cell configuration completion message to the second base station, so as to notify the second base station that the user equipment has completed configuration of the secondary cell. Alternatively, the user equipment always sends the secondary cell configuration completion message to the first base station or the second base station, no matter whether the user equipment receives the secondary cell configuration information from the first base station or the second base station. That is, how the user equipment feeds back the secondary cell configuration completion message is not specifically limited.

Figure 3:
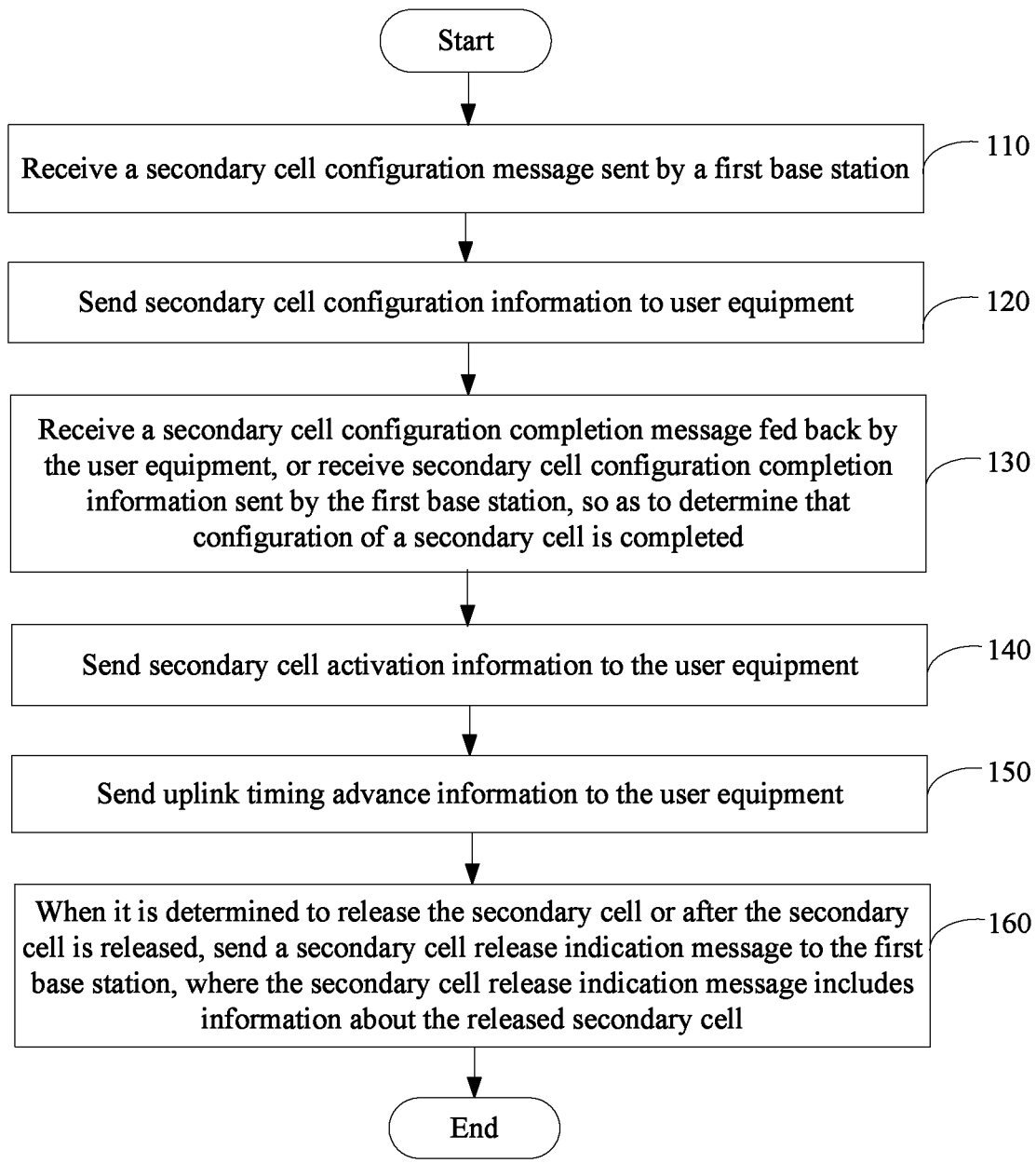
FIG. 3 is another schematic flowchart of a method for configuring a secondary cell according to an embodiment of the present application.

Referring to FIG. 3, an embodiment of the present application discloses a schematic flowchart of a method for configuring a secondary cell, where the method includes:

Step 110: Receive a secondary cell configuration message sent by a first base station.

The secondary cell configuration message includes a secondary cell index configured by the first base station for a secondary cell, where the secondary cell is a cell of another base station except the first base station.

Step 120: Send secondary cell configuration information to user equipment.

The secondary cell configuration information includes the secondary cell index configured by the first base station for the secondary cell, the user equipment configures the index for the corresponding secondary cell according to the secondary cell index, and the secondary cell index is used for activation or deactivation of the secondary cell.

Step 130: Receive a secondary cell configuration completion message fed back by the user equipment, or receive secondary cell configuration completion information sent by the first base station, so as to determine that configuration of a secondary cell is completed.

The secondary cell configuration completion information is that the first base station receives the secondary cell configuration completion message fed back by the user equipment; or the secondary cell configuration completion information is generated by the first base station after the secondary cell configuration completion message fed back by the user equipment is received.

Step 140: Send secondary cell activation information to the user equipment.

The secondary cell activation information includes instruction information about activating and/or deactivating the secondary cell.

The secondary cell activation information is used to make the user equipment really start to work on the cell, that is, make the user equipment start to listen to a physical downlink control channel of the secondary cell, and decode a physical downlink shared channel according to the physical downlink control channel.

Further, when a base station needs to activate a secondary cell for user equipment, the base station sends instruction information about activating and/or deactivating the secondary cell to the secondary cell, where a format of the instruction information about activating and/or deactivating the secondary cell is as follows:

| $C_7$ | $C_6$ | $C_5$ | $C_4$ | $C_3$ | $C_2$ | $C_1$ | R |

C1-C7 represents seven secondary cells. If a bit corresponding to a secondary cell is 1, it indicates that a secondary cell should be activated; if a corresponding bit is 0, it indicates that a secondary cell should be deactivated. After a secondary cell is activated, the user equipment can perform data transmission in the secondary cell.

In the present application, the instruction information about activating and/or deactivating the secondary cell may be sent by the first base station, or may be sent by a second base station. That is, the instruction information about activating and/or deactivating the secondary cell may be sent to the user equipment by using a cell of the first base station, or may be sent to the user equipment by using a cell of the second base station.

Step 150: Send uplink timing advance information to the user equipment, where the uplink timing advance information includes a timing advance used for adjusting an uplink timing advance of the secondary cell, and an index of a timing advance group to which the secondary cell belongs.

When the user equipment moves, a base station often sends uplink timing advance information to the user equipment, so as to update a TA value of the user equipment in the secondary cell or a TA value of the user equipment in a TAG to which the secondary cell belongs. For example, the following is a format of the uplink timing advance information, where TAG id indicates an index of a timing advance group to which a secondary cell belongs, of which a base station requires a TA update, and Timing Advance Command indicates a TA value required to be adjusted when uplink transmission is performed in the secondary cell of the TAG.

| TAG Id | Timing Advance Command |

Step 160: When it is determined to release the secondary cell or after the secondary cell is released, send a secondary cell release indication message to the first base station, where the secondary cell release indication message includes information about the released secondary cell.

When the second base station determines to release a secondary cell for the first base station, the second base station sends a secondary cell release indication message to the first base station, so as to notify the first base station of the released secondary cell, and then the first base station can allocate, to another secondary cell, an SCell index that has been allocated to the secondary cell. Alternatively, when all secondary cells in a TAG are released, the first base station can allocate an index of the TAG to another TAG for use. Alternatively, when all secondary cells in a TAG are released, or after a secondary cell is released, and the TAG is empty, a TAG release indication message may be directly sent.

Figure 4:
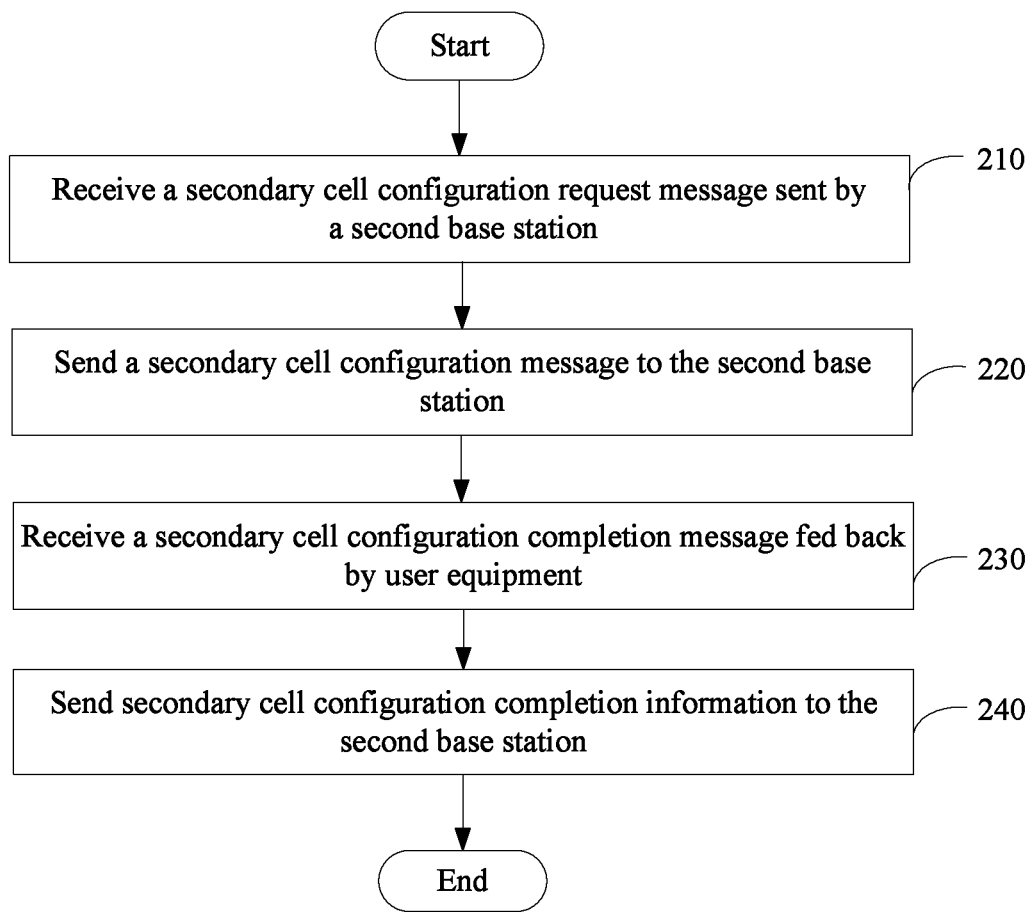
FIG. 4 is another schematic flowchart of a method for configuring a secondary cell according to an embodiment of the present application.

Referring to FIG. 4, an embodiment of the present application discloses a schematic flowchart of a method for configuring a secondary cell, where the method includes:

Step 210: Receive a secondary cell configuration request message sent by a second base station.

The secondary cell configuration request message is used to request to allocate a secondary cell index to a secondary cell, and the secondary cell is a cell of the second base station. The second base station may be a small eNodeB.

Step 220: Send a secondary cell configuration message to the second base station.

The secondary cell configuration message includes a secondary cell index configured for the secondary cell.

Step 230: Receive a secondary cell configuration completion message fed back by user equipment.

Step 240: Send secondary cell configuration completion information to the second base station.

The secondary cell configuration completion information is that the secondary cell configuration completion message fed back by the user equipment is received; or the secondary cell configuration completion information is generated after the secondary cell configuration completion message fed back by the user equipment is received.

Figure 5:
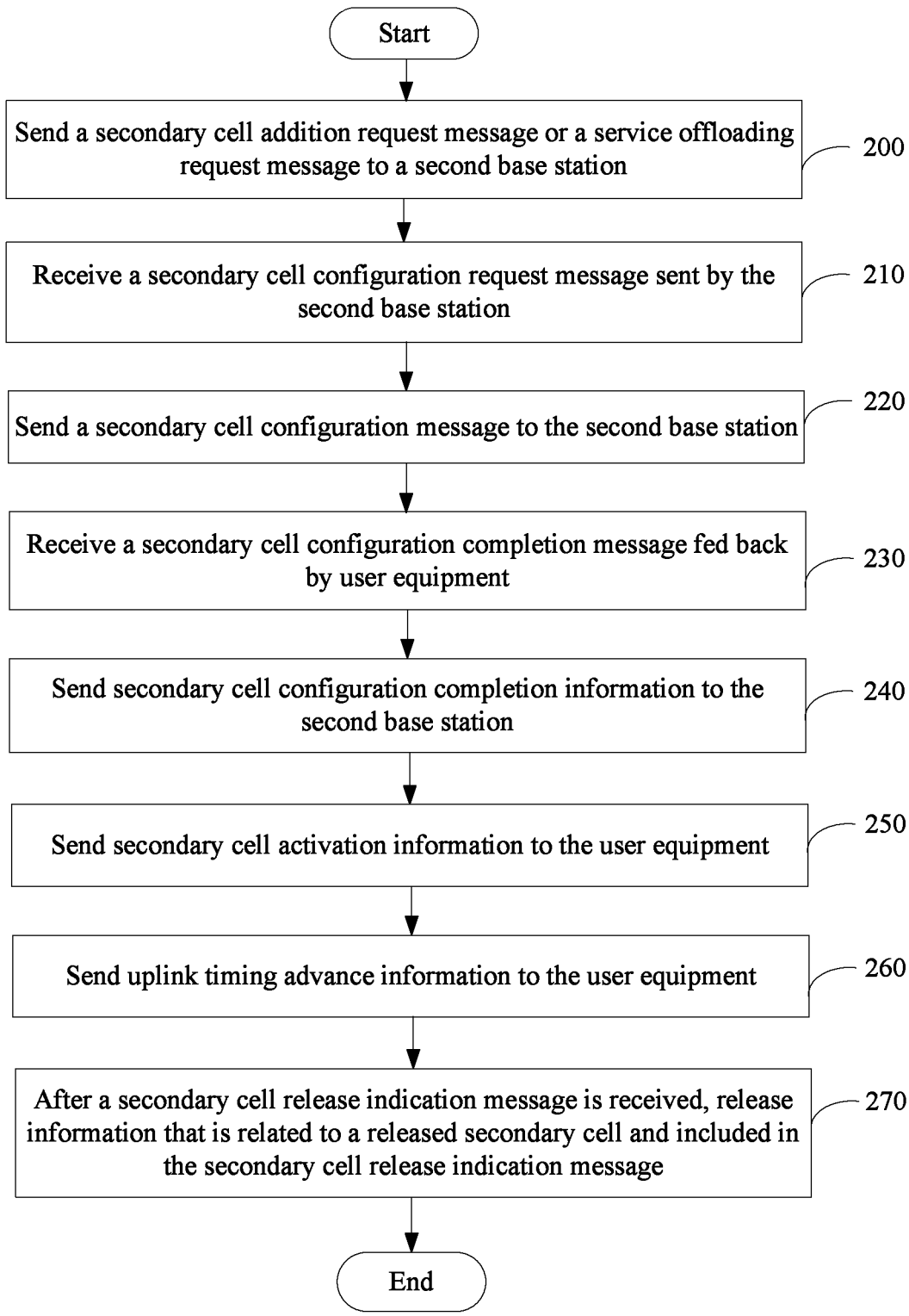
FIG. 5 is another schematic flowchart of a method for configuring a secondary cell according to an embodiment of the present application.

Referring to FIG. 5, an embodiment of the present application discloses a schematic flowchart of a method for configuring a secondary cell, where the method includes:

Step 200: Send a secondary cell/secondary eNodeB addition request message or a service offloading request message to a second base station.

The second base station may be a second base station.

Step 210: Receive a secondary cell configuration request message sent by the second base station.

The secondary cell configuration request message is used to request to allocate a secondary cell index to a secondary cell, and the secondary cell is a cell of the second base station.

Step 220: Send a secondary cell configuration message to the second base station.

The secondary cell configuration message includes a secondary cell index configured for the secondary cell.

Step 230: Receive a secondary cell configuration completion message fed back by user equipment.

Step 240: Send secondary cell configuration completion information to the second base station.

The secondary cell configuration completion information is that the secondary cell configuration completion message fed back by the user equipment is received; or the secondary cell configuration completion information is generated after the secondary cell configuration completion message fed back by the user equipment is received.

Step 250: Send secondary cell activation information to the user equipment.

The secondary cell activation information includes instruction information about activating and/or deactivating the secondary cell.

Step 260: Send uplink timing advance information to the user equipment.

The uplink timing advance information includes a timing advance used for adjusting an uplink timing advance of the secondary cell, and an index of a timing advance group to which the secondary cell belongs.

Step 270: After a secondary cell release indication message is received, release information that is related to a released secondary cell and included in the secondary cell release indication message.

Figure 6:
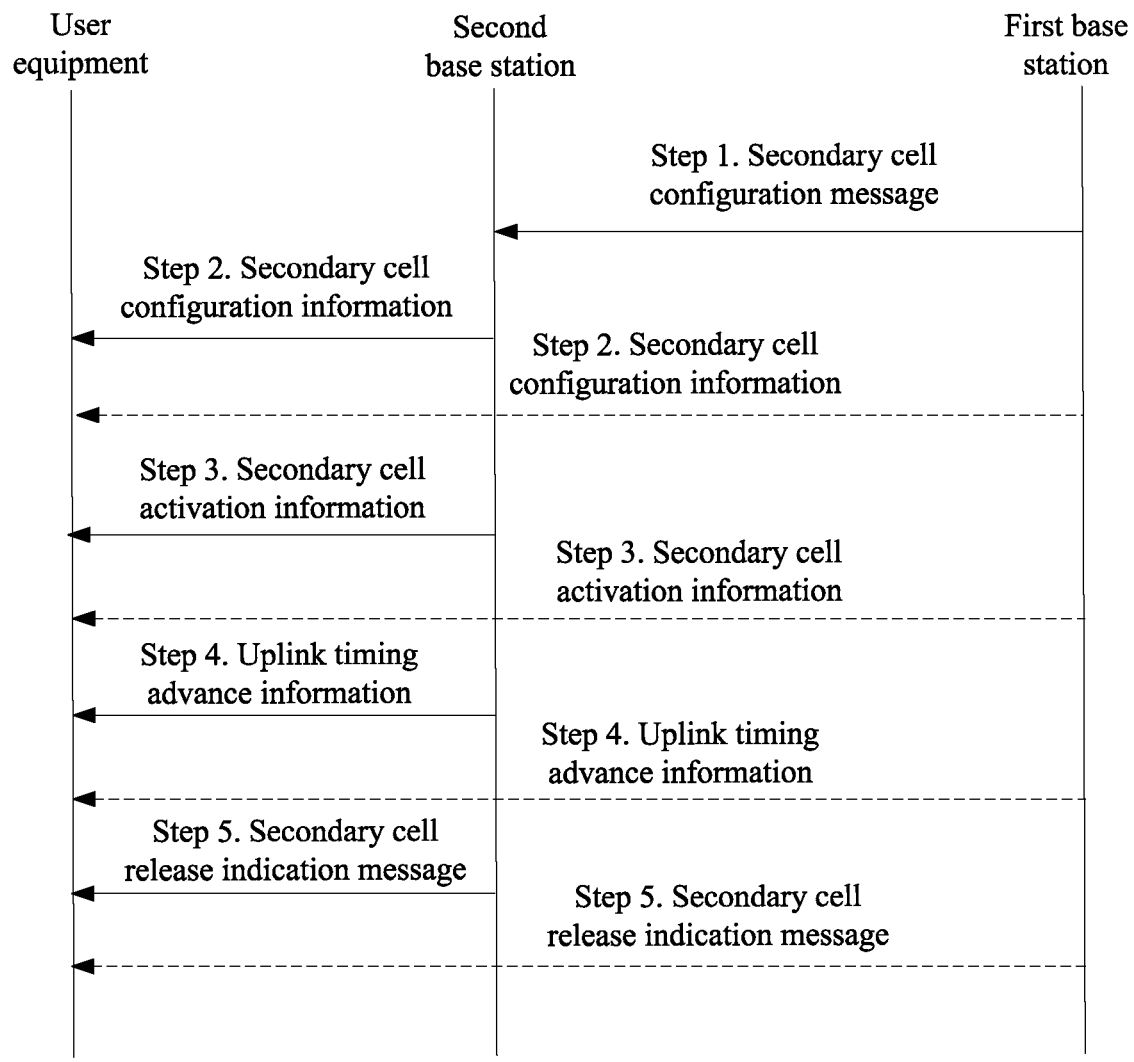
FIG. 6 is a schematic signaling diagram of a method for configuring a secondary cell according to an embodiment of the present application.

Referring to FIG. 6, to describe an implementation manner of the present application more clearly, an embodiment of the present application is described using a signaling diagram, and the method includes:

Step 1: A first base station sends a secondary cell configuration message to a second base station.

Before this step, when the second base station is about to configure or reconfigure one or more secondary cells for user equipment; or when the first base station sends a secondary cell/secondary eNodeB addition request message to the second base station, and the second base station receives the secondary cell/secondary eNodeB addition request message sent by the first base station; or when the first base station sends a service offloading request message to the second base station, and the second base station receives the service offloading request message sent by the first base station, the second base station sends a secondary cell configuration request message to the first base station, where the secondary cell configuration request message may include a secondary cell index expected to be used, or an index that is expected to be used and of a timing advance group to which the secondary cell belongs. The secondary cell configuration request message is used to request the first base station to allocate a secondary cell index or an index of a timing advance group to which a secondary cell belongs.

After receiving the secondary cell configuration request message fed back by the second base station, the first base station sends the secondary cell configuration message to the second base station, where the secondary cell configuration message may include an SCell index configured by the first base station for the secondary cell. Moreover, in addition to the SCell index, the secondary cell configuration message may include a group index that is of a timing advance group to which the secondary cell belongs and is configured by the first base station for the secondary cell; or in addition to the SCell index, the secondary cell configuration message may include a secondary cell/secondary eNodeB addition request message or a service offloading request message.

Step 2: The second base station or the first base station sends secondary cell configuration information to user equipment.

The secondary cell configuration information includes the secondary cell configuration message received by the second base station from the first base station. After completing configuration of the corresponding secondary cell according to the secondary cell configuration information, the user equipment sends a secondary cell configuration completion message to the first base station or the second base station. If the user equipment receives the secondary cell configuration information from the first base station, the user equipment sends the secondary cell configuration completion message to the first base station, and then the first base station sends an indication message to the second base station according to the secondary cell configuration completion message, so as to notify the second base station that the user equipment has completed configuration of the secondary cell. Alternatively, if the user equipment receives the secondary cell configuration information from the second base station, the user equipment sends the secondary cell configuration completion message to the second base station, so as to notify the second base station that the user equipment has completed configuration of the secondary cell. Alternatively, the user equipment always sends the secondary cell configuration completion message to the first base station or the second base station, no matter whether the user equipment receives the secondary cell configuration information from the first base station or the second base station. That is, how the user equipment feeds back the secondary cell configuration completion message is not specifically limited.

Step 3: The second base station or the first base station sends secondary cell activation information to the user equipment.

The secondary cell activation information includes instruction information about activating and/or deactivating the secondary cell. Further, the second base station or the first base station sends an SCell activation and/or deactivation MAC CE to the user equipment, so as to activate and/or deactivate the configured SCell for the user equipment. After receiving the SCell activation/deactivation MAC CE, the user equipment activates/deactivates a corresponding SCell according to the MAC CE.

Step 4: The second base station or the first base station sends uplink timing advance information to the user equipment.

When the second base station or the first base station needs to adjust a TA value of an SCell, the second base station or the first base station sends uplink timing advance information to the user equipment, and adjusts a TA value of a TAG of the SCell. The uplink timing advance information includes a timing advance used for adjusting an uplink timing advance of the secondary cell, and an index of a timing advance group to which the secondary cell belongs.

Step 5: The second base station sends a secondary cell release indication message to the first base station.

When it is determined to release the secondary cell or after the secondary cell is released, the second base station sends a secondary cell release indication message to the first base station, where the secondary cell release indication message includes information about the released secondary cell, so as to notify the first base station of the released secondary cell, and then the first base station can allocate, to another secondary cell, the SCell index that has been allocated to the secondary cell.

Figure 7:
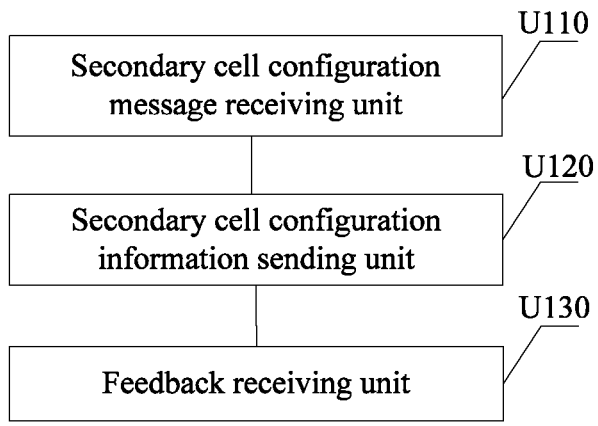
FIG. 7 is a schematic diagram of a structure of an apparatus for configuring a secondary cell according to an embodiment of the present application.

Referring to FIG. 7, corresponding to the foregoing method embodiment, an embodiment of the present application provides a schematic diagram of a structure of an apparatus for configuring a secondary cell, where the apparatus for configuring a secondary cell includes:

a secondary cell configuration message receiving unit U110, configured to receive a secondary cell configuration message sent by a first base station, where the secondary cell configuration message includes a secondary cell index configured by the first base station for a secondary cell, and the secondary cell is a cell of another base station except the first base station;

a secondary cell configuration information sending unit U120, configured to send secondary cell configuration information to user equipment, where the secondary cell configuration information includes the secondary cell index configured by the first base station for the secondary cell, the user equipment configures the index for the corresponding secondary cell according to the secondary cell index, and the secondary cell index is used for activation or deactivation of the secondary cell; and a feedback receiving unit U130, configured to receive a secondary cell configuration completion message fed back by the user equipment, or receive secondary cell configuration completion information sent by the first base station, so as to determine that configuration of the secondary cell is completed, where:

the secondary cell configuration completion information is that the first base station receives the secondary cell configuration completion message fed back by the user equipment; or the secondary cell configuration completion information is generated by the first base station after the secondary cell configuration completion message fed back by the user equipment is received.

This embodiment of the present application provides the apparatus for configuring a secondary cell. A first base station allocates a secondary cell index, where the secondary cell index is used by user equipment to configure the index for a corresponding secondary cell; after completing configuration of the secondary cell index, the user equipment feeds back a secondary cell configuration completion message; and after the secondary cell configuration completion message fed back is received or a secondary cell configuration completion information sent by the first base station is received, configuration of the secondary cell is completed. After configuration of the secondary cell is completed, when the first base station or a second base station further delivers a related operation instruction to perform a related operation such as activation or deactivation, or delivers a timing advance adjustment message, a related message or related signaling does not need to carry a device identifier of the base station each time. Therefore, a load information amount of a message can be reduced.

Figure 8:
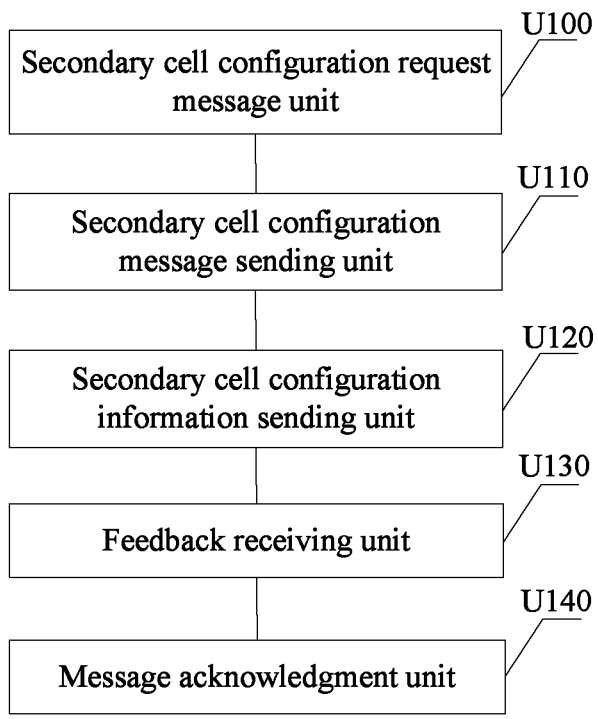
FIG. 8 is another schematic diagram of a structure of an apparatus for configuring a secondary cell according to an embodiment of the present application.

Referring to FIG. 8, the apparatus for configuring a secondary cell further includes a secondary cell configuration request message sending unit U100, where the secondary cell configuration request message sending unit U100 is configured to:

when one or more secondary cells are about to be configured or reconfigured for the user equipment, or when a secondary cell/secondary eNodeB addition request message sent by the first base station is received, or when a service offloading request message sent by the first base station is received, send a secondary cell configuration request message to the first base station, where the secondary cell configuration request message is used to request the first base station to allocate a secondary cell index.

Further, the secondary cell configuration message further includes a group index that is of a timing advance group to which the secondary cell belongs and is configured by the first base station for the secondary cell; and the secondary cell configuration information further includes the group index that is of the timing advance group to which the secondary cell belongs and is configured by the first base station for the secondary cell.

Further, the apparatus further includes a service request message sending unit, where the service request message sending unit is configured to: when the secondary cell configuration message receiving unit receives the secondary cell configuration message sent by the first base station, simultaneously receive a secondary cell/secondary eNodeB addition request message or a service offloading request message sent by the first base station;

or the secondary cell configuration message received by the secondary cell configuration message receiving unit is included in a secondary cell/secondary eNodeB addition request message or a service offloading request message sent by the service request message sending unit.

Further, the apparatus for configuring a secondary cell further includes a message acknowledgment unit U140, configured to send a secondary cell configuration acknowledgment message to the first base station, where:

the secondary cell configuration acknowledgment message includes acknowledgment information that the secondary cell index is configured for the secondary cell; or the secondary cell configuration acknowledgment message includes the secondary cell index configured for the secondary cell.

Further, the secondary cell configuration request message further includes:

a secondary cell index expected to be used, or an index that is expected to be used and of a timing advance group to which the secondary cell belongs.

Figure 9:
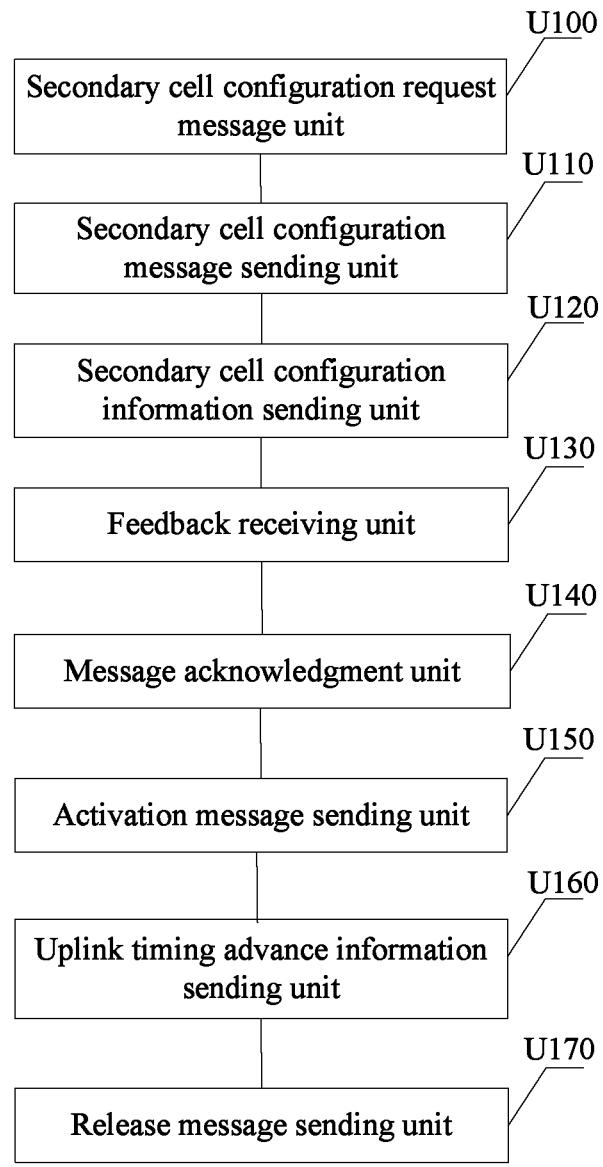
FIG. 9 is another schematic diagram of a structure of an apparatus for configuring a secondary cell according to an embodiment of the present application.

Referring to FIG. 9, the apparatus for configuring a secondary cell further includes an activation message sending unit U150, configured to send secondary cell activation information to the user equipment, where the secondary cell activation information includes instruction information about activating and/or deactivating the secondary cell.

Further, the apparatus for configuring a secondary cell further includes an uplink timing advance information sending unit U160, configured to send uplink timing advance information to the user equipment, where the uplink timing advance information includes a timing advance used for adjusting an uplink timing advance of the secondary cell, and an index of a timing advance group to which the secondary cell belongs.

Further, the apparatus for configuring a secondary cell further includes a release message sending unit U170, configured to: when it is determined to release the secondary cell or after the secondary cell is released, send a secondary cell release indication message to the first base station, where the secondary cell release indication message includes information about the released secondary cell.

Figure 10:
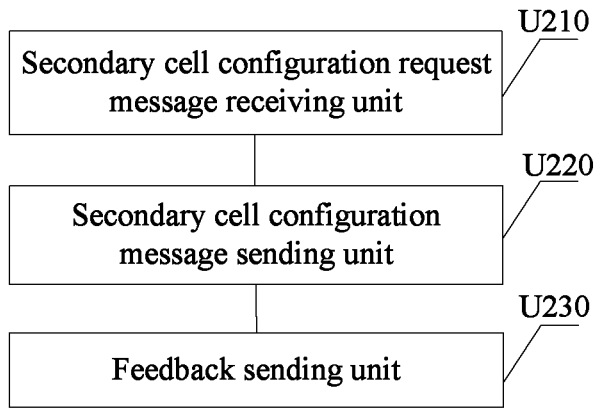
FIG. 10 is another schematic diagram of a structure of an apparatus for configuring a secondary cell according to an embodiment of the present application.

Referring to FIG. 10, an embodiment of the present application provides a schematic diagram of a structure of an apparatus for configuring a secondary cell, where the apparatus includes:

a secondary cell configuration request message receiving unit U210, configured to receive a secondary cell configuration request message sent by a second base station, where the secondary cell configuration request message is used to request to allocate a secondary cell index to a secondary cell, and the secondary cell is a cell of the second base station;

a secondary cell configuration message sending unit U220, configured to send a secondary cell configuration message to the second base station, where the secondary cell configuration message includes a secondary cell index configured for the secondary cell;

a secondary cell configuration completion message receiving unit, configured to receive a secondary cell configuration completion message fed back by user equipment; and a feedback sending unit U230, configured to send secondary cell configuration completion information to the second base station, where:

the secondary cell configuration completion information is that the secondary cell configuration completion message fed back by the user equipment is received; or the secondary cell configuration completion information is generated after the secondary cell configuration completion message fed back by the user equipment is received.

Figure 11:
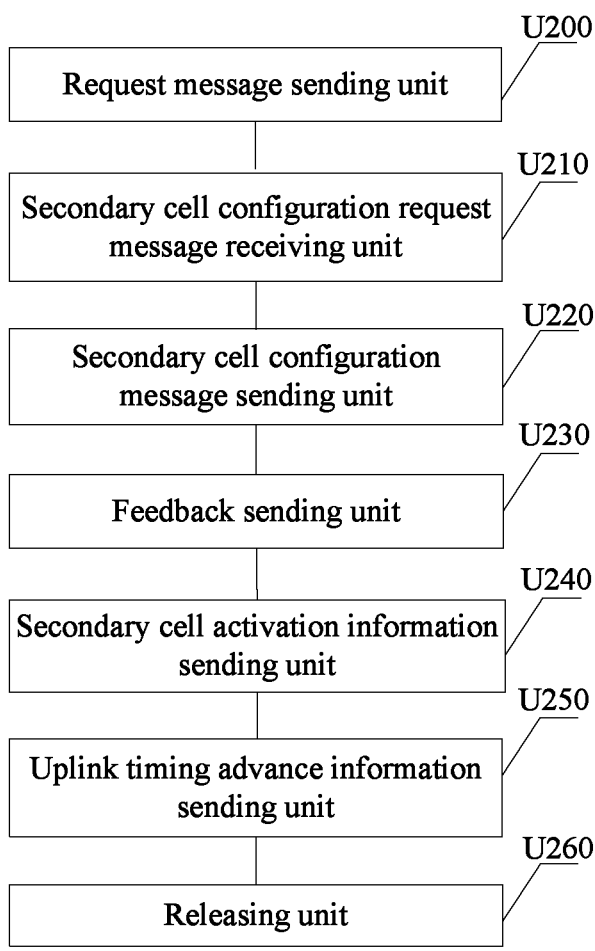
FIG. 11 is another schematic diagram of a structure of an apparatus for configuring a secondary cell according to an embodiment of the present application.

Referring to FIG. 11, further, the apparatus for configuring a secondary cell further includes:

a request message sending unit U200, configured to send a secondary cell/secondary eNodeB addition request message or a service offloading request message to the second base station.

Further, the apparatus for configuring a secondary cell further includes:

a secondary cell activation information sending unit U240, configured to send secondary cell activation information to the user equipment, where the secondary cell activation information includes instruction information about activating and/or deactivating the secondary cell.

Further, the apparatus for configuring a secondary cell further includes:

an uplink timing advance information sending unit U250, configured to send uplink timing advance information to the user equipment, where the uplink timing advance information includes a timing advance used for adjusting an uplink timing advance of the secondary cell, and an index of a timing advance group to which the secondary cell belongs.

Further, the apparatus for configuring a secondary cell further includes:

a releasing unit U260, configured to: after a secondary cell release indication message is received, release information that is related to a released secondary cell and included in the secondary cell release indication message.

Figure 12:
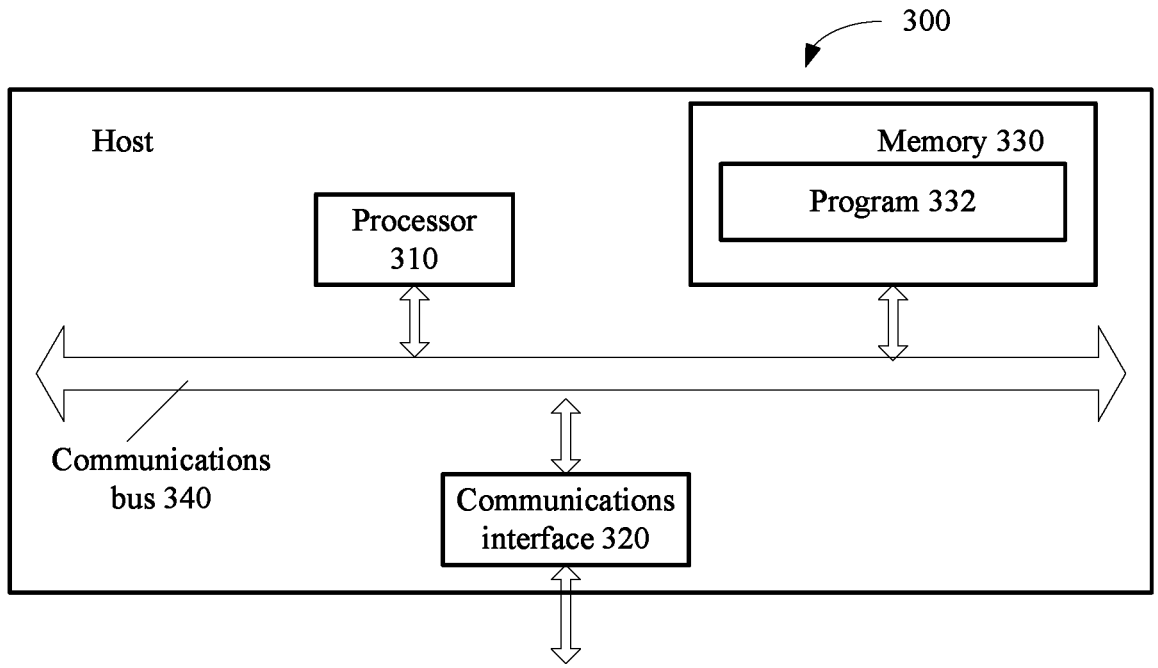
FIG. 12 is a schematic diagram of a structure of a host 300 according to an embodiment of the present application.

Referring to FIG. 12, an embodiment of the present application provides a schematic diagram of a host 300. The host 300 may be a host server that has a computing capability, a personal computer PC, a portable computer or terminal, or the like. A specific embodiment of the present application imposes no limitation on specific implementation of the host. The host 300 includes:

a processor (processor) 310, a communications interface (Communications Interface) 320, a memory (memory) 330, and a bus 340, where:

the processor 310, the communications interface 320, and the memory 330 complete mutual communication by using the bus 340.

The communications interface 320 is configured to receive a secondary cell configuration message sent by a first base station, where the secondary cell configuration message includes a secondary cell index configured by the first base station for a secondary cell, and the secondary cell is a cell of another base station except the first base station.

The processor 310 is configured to execute a program 332.

The program 332 may include program code, where the program code includes a computer operation instruction.

The processor 310 may be a central processing unit CPU, or an application specific integrated circuit ASIC (Application Specific Integrated Circuit), or one or more integrated circuits configured to implement this embodiment of the present application.

The memory 330 is configured to store the program 332. The memory 330 may include a high-speed RAM memory, and may further include a non-volatile memory (non-volatile memory), for example, at least one disk memory.

The program 332 may be used to:

send secondary cell configuration information to user equipment, where the secondary cell configuration information includes the secondary cell index configured by the first base station for the secondary cell, the user equipment configures the index for the corresponding secondary cell according to the secondary cell index, and the secondary cell index is used for activation or deactivation of the secondary cell; and receive a secondary cell configuration completion message fed back by the user equipment, or receive secondary cell configuration completion information sent by the first base station, so as to determine that configuration of the secondary cell is completed, where:

the secondary cell configuration completion information is that the first base station receives the secondary cell configuration completion message fed back by the user equipment; or the secondary cell configuration completion information is generated by the first base station after the secondary cell configuration completion message fed back by the user equipment is received.

Figure 13:
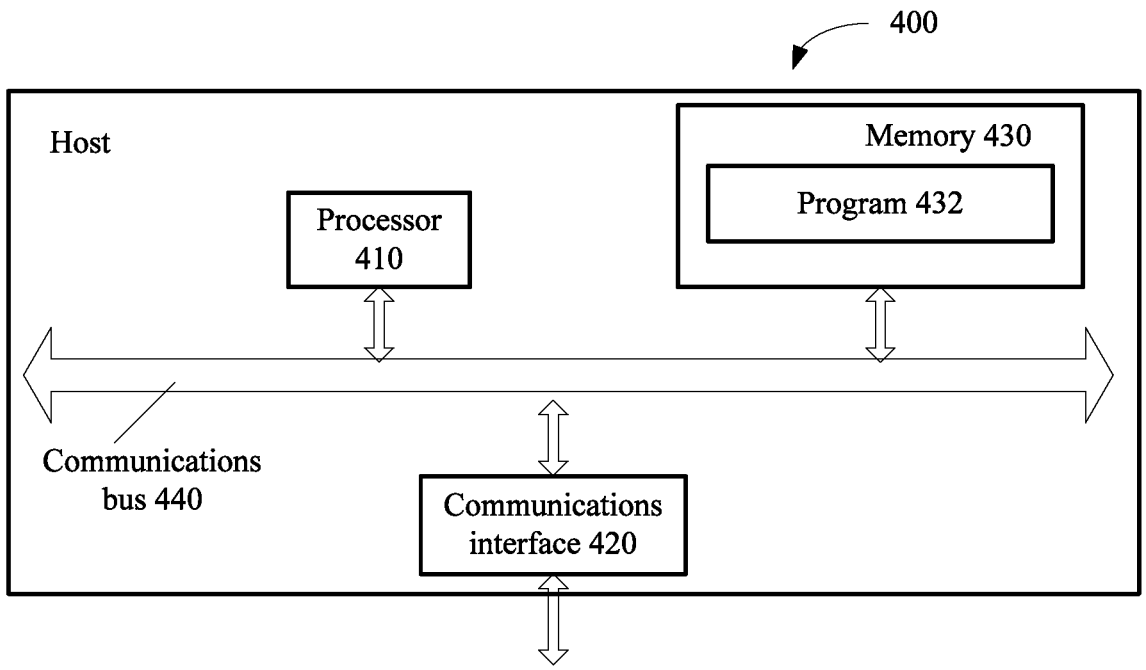
FIG. 13 is a schematic diagram of a structure of a host 400 according to an embodiment of the present application.

Referring to FIG. 13, an embodiment of the present application provides a schematic diagram of a host 400. The host 400 may be a host server that has a computing capability, a personal computer PC, a portable computer or terminal, or the like. A specific embodiment of the present application imposes no limitation on specific implementation of the host. The host 400 includes:

a processor (processor) 410, a communications interface (Communications Interface) 420, a memory (memory) 430, and a bus 440, where:

the processor 410, the communications interface 420, and the memory 430 complete mutual communication by using the bus 440.

The communications interface 420 is configured to receive a secondary cell configuration request message sent by a second base station, where the secondary cell configuration request message is used to request to allocate a secondary cell index to a secondary cell, and the secondary cell is a cell of the second base station.

The processor 410 is configured to execute a program 432.

The program 432 may include program code, where the program code includes a computer operation instruction.

The processor 410 may be a central processing unit CPU, or an application specific integrated circuit ASIC (Application Specific Integrated Circuit), or one or more integrated circuits configured to implement this embodiment of the present application.

The memory 430 is configured to store the program 432. The memory 430 may include a high-speed RAM memory, and may further include a non-volatile memory (non-volatile memory), for example, at least one disk memory.

The program 432 may be used to:

send a secondary cell configuration message to the second base station, where the secondary cell configuration message includes a secondary cell index configured for the secondary cell;

receive a secondary cell configuration completion message fed back by user equipment; and send secondary cell configuration completion information to the second base station, where:

the secondary cell configuration completion information is that the secondary cell configuration completion message fed back by the user equipment is received; or the secondary cell configuration completion information is generated after the secondary cell configuration completion message fed back by the user equipment is received.

A person skilled in the art may understand that the accompanying drawings are merely schematic diagrams of exemplary embodiments, and modules or processes in the accompanying drawings are not necessarily required for implementing the present application.

A person skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments may be combined into one module, or split into a plurality of submodules.

A person of ordinary skill in the art may understand that all or some of the processing in the methods in the foregoing embodiments may be implemented by a program instructing relevant hardware. The program may be stored in a computer-readable storage medium.

The disclosed embodiments are described above to enable a person skilled in the art to implement or use the present application. Various modifications to the embodiments are obvious to the person skilled in the art, and general principles defined in this specification may be implemented in other embodiments without departing from the spirit or scope of the present application. Therefore, the present application will not be limited to the embodiments described in this specification but extends to the widest scope that complies with the principles and novelty disclosed in this specification.

What is claimed is:

1. A communication method comprising:
   receiving, by a secondary eNodeB (SeNB), a secondary cell configuration message from a master eNodeB (MeNB),
      wherein the secondary cell configuration message comprises an unallocated secondary cell index determined and configured by the MeNB for activating or deactivating a secondary cell of the SeNB;
   receiving, by the SeNB, secondary cell configuration completion information from the MeNB, wherein the secondary cell configuration completion information indicates that a configuration of the secondary cell is complete; and
   when it is determined to release the secondary cell or after the secondary cell is released from the configuration, sending, by the SeNB, a secondary cell release indication message to the MeNB, wherein the secondary cell release indication message comprises information about the released secondary cell, and the secondary cell index is unallocated and capable of being allocated to another secondary cell.

2. The method according to claim 1, wherein the secondary cell configuration message is comprised in a secondary cell/secondary eNodeB addition request message.

3. The method according to claim 2, further comprising:
   sending, by the SeNB, a secondary cell configuration acknowledgment message to the MeNB, wherein the secondary cell configuration acknowledgment message comprises the secondary cell index configured for the secondary cell.

4. The method according to claim 1, after configuration of the secondary cell is completed, the method further comprising:

sending, by the SeNB, secondary cell activation information to the user equipment, wherein the secondary cell activation information comprises instructions for activating and/or deactivating the secondary cell.

5. A method for configuring a secondary cell, the method comprising:
   determining, by a master eNodeB (MeNB), an unallocated secondary cell index for allocation to a secondary cell of a secondary eNodeB (SeNB);
   configuring the secondary cell index for activation or deactivation of the secondary cell;
   sending, by the MeNB, a secondary cell configuration message to the SeNB, wherein the secondary cell configuration message comprises the secondary cell index configured for activation or deactivation of the secondary cell;
   receiving, by the MeNB, a secondary cell configuration completion message fed back by a user equipment;
   sending, by the MeNB, secondary cell configuration completion information to the SeNB in response to receiving the secondary cell configuration completion message from the user equipment, wherein the secondary cell configuration completion information indicates to the SeNB completion of a configuration of the secondary cell according to the secondary cell configuration message; and
   receiving, by the MeNB, a secondary cell release indication message from the SeNB in response to the secondary call being released from the configuration, wherein the secondary cell release indication message comprises information informing the MeNB that the secondary cell is released, and the secondary cell index is unallocated and capable of being allocated to another secondary cell.

6. The method according claim 5, further comprising:
   sending, by the MeNB, a secondary cell/secondary eNodeB addition request message or a service offloading request message to the SeNB.

7. The method according to claim 6, wherein after completing configuration of the secondary cell, the method further comprising:
   sending, by the MeNB, secondary cell activation information to the user equipment, wherein the secondary cell activation information comprises instructions for activating and/or deactivating the secondary cell.

8. The method according to claim 7, wherein after the sending secondary cell activation information to the user equipment, the method further comprising:
   sending, by the MeNB, uplink timing advance information to the user equipment, wherein the uplink timing advance information comprises a timing advance used to adjust an uplink timing advance of the secondary cell and an index of a timing advance group to which the secondary cell belongs.

9. The method according to claim 5, the method further comprising:
   after a secondary cell release indication message is received, releasing, by the MeNB, information that is related to a released secondary cell and comprised in the secondary cell release indication message.

10. An apparatus applied in a secondary eNodeB (SeNB), the apparatus comprising:
    a processor;
    a receiver configured to cooperate with the processor to receive a secondary cell configuration message from a master eNodeB (MeNB),
    wherein the secondary cell configuration message comprises an unallocated secondary cell index determined and configured by the MeNB for activating and deactivating a secondary cell of the SeNB;
    the receiver is further configured to cooperate with the processor to receive secondary cell configuration completion information from the MeNB, wherein the secondary cell configuration completion information indicates that configuration of the secondary cell is complete; and
    a transmitter configured to cooperate with the processor to send a secondary cell release indication message to the MeNB when it is determined to release the secondary cell from the configuration or after the secondary cell is released from the configuration, wherein the secondary cell release indication message comprises information about the released secondary cell, and the secondary cell index is unallocated and capable of being allocated to another secondary cell.

11. The apparatus according to claim 10, wherein the secondary cell configuration message is comprised in a secondary cell/secondary eNodeB addition request message.

12. The apparatus according to claim 11, wherein the transmitter is further configured to send a secondary cell configuration acknowledgment message to the MeNB, the secondary cell configuration acknowledgment message comprising the secondary cell index.

13. The apparatus according to claim 10, wherein the transmitter is further configured to send secondary cell activation information to the user equipment, the secondary cell activation information comprising instructions for activating and/or deactivating the secondary cell.

14. An apparatus applied in a master eNodeB (MeNB), the apparatus comprising:
    a processor configured to determine an unallocated secondary cell index for allocation to a secondary cell of a secondary eNodeB (SeNB), and configure the secondary cell index for activation or deactivation of the secondary cell;
    a transmitter configured to cooperate with the processor to send a secondary cell configuration message to the SeNB in response to receiving the secondary cell configuration completion message from the user equipment, wherein the secondary cell configuration message comprises the secondary cell index configured for activation or deactivation of the secondary cell;
    a receiver configured to cooperate with the processor to receive a secondary cell configuration completion message fed back by user equipment;
    the transmitter is further configured to cooperate with the processor to send secondary cell configuration completion information to the SeNB in response to receiving the secondary cell configuration completion message from the user equipment, wherein the secondary cell configuration completion information indicates to the SeNB completion of configuration of the secondary cell according to the secondary cell configuration message; and
    the receiver further configured to cooperate with the processor to obtain a secondary cell release indication message sent from the SeNB in response to the secondary call being released from the configuration, wherein the secondary cell release indication message comprises information informing the MeNB that the secondary cell is released, and the secondary cell index is unallocated and capable of being allocated to another secondary cell.

15. The apparatus according to claim 14, wherein the transmitter is further configured to cooperate with the processor to send a secondary cell/secondary eNodeB addition request message or a service offloading request message to the SeNB.

16. The apparatus according to claim 15, wherein the transmitter is further configured to cooperate with the processor to send secondary cell activation information to the user equipment, the secondary cell activation information comprising instructions for activating and/or deactivating the secondary cell.

17. The apparatus according to claim 15, wherein the transmitter is further configured to cooperate with the processor to send uplink timing advance information to the user equipment, the uplink timing advance information comprising a timing advance used to adjust an uplink timing advance of the secondary cell, and an index of a timing advance group to which the secondary cell belongs.

18. The apparatus according to claim 14, wherein the processor is further configured to, after a secondary cell release indication message is received, release information related to a released secondary cell and in the secondary cell release indication message.

* * * * *